US012630019B2

(12) United States Patent
Yoshimura et al.

(10) Patent No.: US 12,630,019 B2
(45) Date of Patent: May 19, 2026

(54) DISPLAY CONTROL DEVICE, DISPLAY CONTROL METHOD, AND STORAGE MEDIUM

(71) Applicant: HONDA MOTOR CO., LTD., Tokyo (JP)

(72) Inventors: Misako Yoshimura, Wako (JP); Kosuke Nakanishi, Wako (JP); Takaaki Beppu, Tokyo (JP); Haojie Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/611,941

(22) Filed: Mar. 21, 2024

(65) Prior Publication Data

US 2025/0178437 A1      Jun. 5, 2025

(30) Foreign Application Priority Data

Mar. 29, 2023      (JP) ................................. 2023-053510

(51) Int. Cl.
B60K 35/28                (2024.01)
(52) U.S. Cl.
CPC ........ B60K 35/28 (2024.01); B60K 2360/171 (2024.01); B60K 2360/178 (2024.01); B60K 2360/179 (2024.01); B60K 2360/1868 (2024.01)
(58) Field of Classification Search
CPC .............. B60K 35/28; B60K 2360/178; B60K 2360/171; B60K 2360/1868; B60K 2360/179
See application file for complete search history.

(56) References Cited

U.S. PATENT DOCUMENTS

| | | | | |
|---|---|---|---|---|
| 7,356,408 B2 * | 4/2008 | Tsuchiya | ................ | G08G 1/165 |
| | | | | 701/538 |
| 8,854,231 B2 * | 10/2014 | Thomas | .................... | B60R 1/27 |
| | | | | 348/148 |
| 10,473,480 B2 * | 11/2019 | Arita | .................. | G01C 21/3679 |
| 11,623,523 B2 * | 4/2023 | Almeida | .............. | G06V 40/103 |
| | | | | 340/464 |
| 11,967,238 B2 * | 4/2024 | Churko | .................. | G08G 1/166 |
| 2007/0013497 A1 * | 1/2007 | Watanabe | ............. | G01S 7/4004 |
| | | | | 340/435 |
| 2009/0059005 A1 * | 3/2009 | Hattori | ..................... | B60R 1/26 |
| | | | | 348/148 |

(Continued)

FOREIGN PATENT DOCUMENTS

| | | |
|---|---|---|
| JP | 2022-040223 | 3/2022 |
| JP | 7296490 B2 * | 6/2023 |

*Primary Examiner* — Chico A Foxx
(74) *Attorney, Agent, or Firm* — Amin, Turocy & Watson, LLP

(57)      ABSTRACT

A display control device that is one aspect of an embodiment includes an acquirer configured to acquire surrounding conditions of a mobile object, and a display controller configured to cause a display to display a first image indicating a position of the mobile object, a second image indicating a position of an obstacle present within a predetermined distance from the mobile object, which is acquired by the acquirer, and a third image indicating that the mobile object and the obstacle are approaching each other, in which the third image includes an image indicating from which of left and right sides the obstacle is approaching the mobile object.

8 Claims, 10 Drawing Sheets

(56) References Cited

U.S. PATENT DOCUMENTS

| | | | | |
|---|---|---|---|---|
| 2009/0273456 A1* | 11/2009 | Albertini | .................... | G01S 7/64 |
| | | | | 367/129 |
| 2010/0253493 A1* | 10/2010 | Szczerba | ............... | G02B 27/01 |
| | | | | 345/593 |
| 2012/0287277 A1* | 11/2012 | Koehrsen | ................. | B60R 1/28 |
| | | | | 348/148 |
| 2017/0003848 A1* | 1/2017 | Wakayanagi | ...... | G01C 21/3664 |
| 2017/0036601 A1* | 2/2017 | Kimura | ................ | G06V 20/584 |
| 2018/0058879 A1* | 3/2018 | Tayama | ................ | B60W 30/16 |
| 2018/0090002 A1* | 3/2018 | Arita | ....................... | G02B 27/01 |
| 2019/0116315 A1* | 4/2019 | Satomi | ................... | H04N 23/90 |
| 2019/0337455 A1* | 11/2019 | Kusayanagi | ............. | B60R 1/27 |
| 2019/0351824 A1* | 11/2019 | Kim | ...................... | B60W 10/18 |
| 2020/0407948 A1* | 12/2020 | Seki | .......................... | G06T 1/00 |
| 2021/0009135 A1* | 1/2021 | Taniguchi | .............. | B60K 35/22 |
| 2021/0023994 A1* | 1/2021 | Watanabe | ................ | G06T 7/73 |
| 2022/0024316 A1* | 1/2022 | Suzuki | ................... | B60K 35/28 |
| 2022/0135063 A1* | 5/2022 | Seitz | ....................... | G07C 5/02 |
| | | | | 701/23 |
| 2022/0212690 A1* | 7/2022 | Zheng | ................... | B60K 35/10 |
| 2023/0046484 A1* | 2/2023 | Fang | ...................... | B60K 35/00 |
| 2024/0109554 A1* | 4/2024 | Fujimura | ........... | B60W 30/095 |
| 2024/0199055 A1* | 6/2024 | Higuchi | ......... | B60W 30/18072 |
| 2024/0221246 A1* | 7/2024 | Shimazu | ........... | H04N 5/44504 |
| 2024/0249626 A1* | 7/2024 | Tsujino | ................. | G08G 1/167 |

* cited by examiner

<u>1</u>

DISPLAY CONTROL DEVICE, DISPLAY CONTROL METHOD, AND STORAGE MEDIUM

CROSS-REFERENCE TO RELATED APPLICATION

Priority is claimed on Japanese Patent Application No. 2023-053510, filed Mar. 29, 2023, the content of which is incorporated herein by reference.

BACKGROUND

Field of the Invention

The present invention relates to a display control device, a display control method, and a storage medium.

Description of Related Art

In recent years, efforts have become active to provide access to sustainable transport systems that take into account the most vulnerable of traffic participants. To achieve this goal, research and development has been focused on, which will further improve traffic safety and convenience through research and development on preventive safety technologies. In relation to this, in recent years, when a distance between a vehicle and an obstacle present on the right rear or left rear of the vehicle decreases due to the vehicle moving at a speed lower than a reference value, a technology is known in which an image corresponding to an obstacle is superimposed and displayed on the right end or left end of a first image obtained by taking an image of the rear of the vehicle according to a position of the obstacle (for example, Japanese Unexamined Patent Application, First Publication No. 2022-40223).

SUMMARY

Incidentally, there is a problem in the preventive safety technology that it may not be possible to appropriately present how an obstacle approaches a mobile object. To solve the problem described above, one purpose of this application is to provide a display control device, a display control method, and a storage medium that can present more appropriate information on how an obstacle is approaching a mobile object. This consequently contributes to the development of a sustainable transportation system as well.

A display control device, a display control method, and a storage medium according to the present invention have adopted the following configuration.

(1): A display control device according to one aspect of the present invention includes an acquirer configured to acquire surrounding conditions of a mobile object, and a display controller configured to cause a display to display a first image indicating a position of the mobile object, a second image indicating a position of an obstacle present within a predetermined distance from the mobile object, which is acquired by the acquirer, and a third image indicating that the mobile object and the obstacle are approaching each other, in which the third image includes an image indicating from which of left and right sides the obstacle is approaching the mobile object.

(2): In the aspect of (1) described above, the third image may be displayed between the first image and the second image.

(3): In the aspect of (2) described above, the third image may be drawn as a continuous diagonal line in a traveling direction of the mobile object, and the diagonal line may be drawn to extend in a movement direction of the mobile object to avoid the obstacle.

(4): In the aspect of (3) described above, the display controller may cause the third image in which a width of the diagonal line has changed depending on a size of the obstacle to be displayed.

(5): In the aspect of (4) described above, the display controller may cause the third image in which the width of the diagonal line is made longer at a position closer to the obstacle to be displayed.

(6): In the aspect of (1) described above, the display controller may cause the third image superimposed on a fourth image indicating a risk area around the mobile object to be displayed.

(7): In the aspect of (1) described above, the mobile object may include a vehicle, and the display controller may cause the third image to be displayed in an area corresponding to a traveling lane of the vehicle.

(8): A display control method according to another aspect of the present invention includes, by a computer, acquiring surrounding conditions of a mobile object, and causing a display to display a first image indicating a position of the mobile object, a second image indicating a position of an obstacle present within a predetermined distance from the mobile object, which is acquired, and a third image indicating that the mobile object and the obstacle are approaching each other, in which the third image includes an image indicating from which of left and right sides the obstacle is approaching the mobile object.

(9): A storage medium according to still another aspect of the present invention is a computer-readable non-transitory storage medium that has stored a program causing a computer to execute acquiring surrounding conditions of a mobile object, and causing a display to display a first image indicating a position of the mobile object, a second image indicating a position of an obstacle present within a predetermined distance from the mobile object, which is acquired, and a third image indicating that the mobile object and the obstacle are approaching each other, in which the third image includes an image indicating from which of left and right sides the obstacle is approaching the mobile object.

According to the aspects of (1) to (9) described above, it is possible to present more appropriate information on how an obstacle is approaching a mobile object.

DESCRIPTION OF EMBODIMENTS

Hereinafter, embodiments of a display control device, a display control method, and a storage medium of the present invention will be described with reference to the drawings. The display control device in the embodiment is mounted on, for example, a mobile object. A mobile object is, for example, a mobile object that can be boarded by an occupant of a vehicle (including a ship and a flying object), but may also include a portable terminal device that can be carried and moved by a person (for example, a smartphone and a tablet device). Description will be provided separately for a case where the mobile object is a vehicle and a case where it is a terminal device. In the following description, a case will be described in which a left-hand driving regulation is applied onto a road, but when a right-hand driving regulation is applied, left and right may be read in reverse.

First Embodiment

[Overall Configuration]

Figure 1:
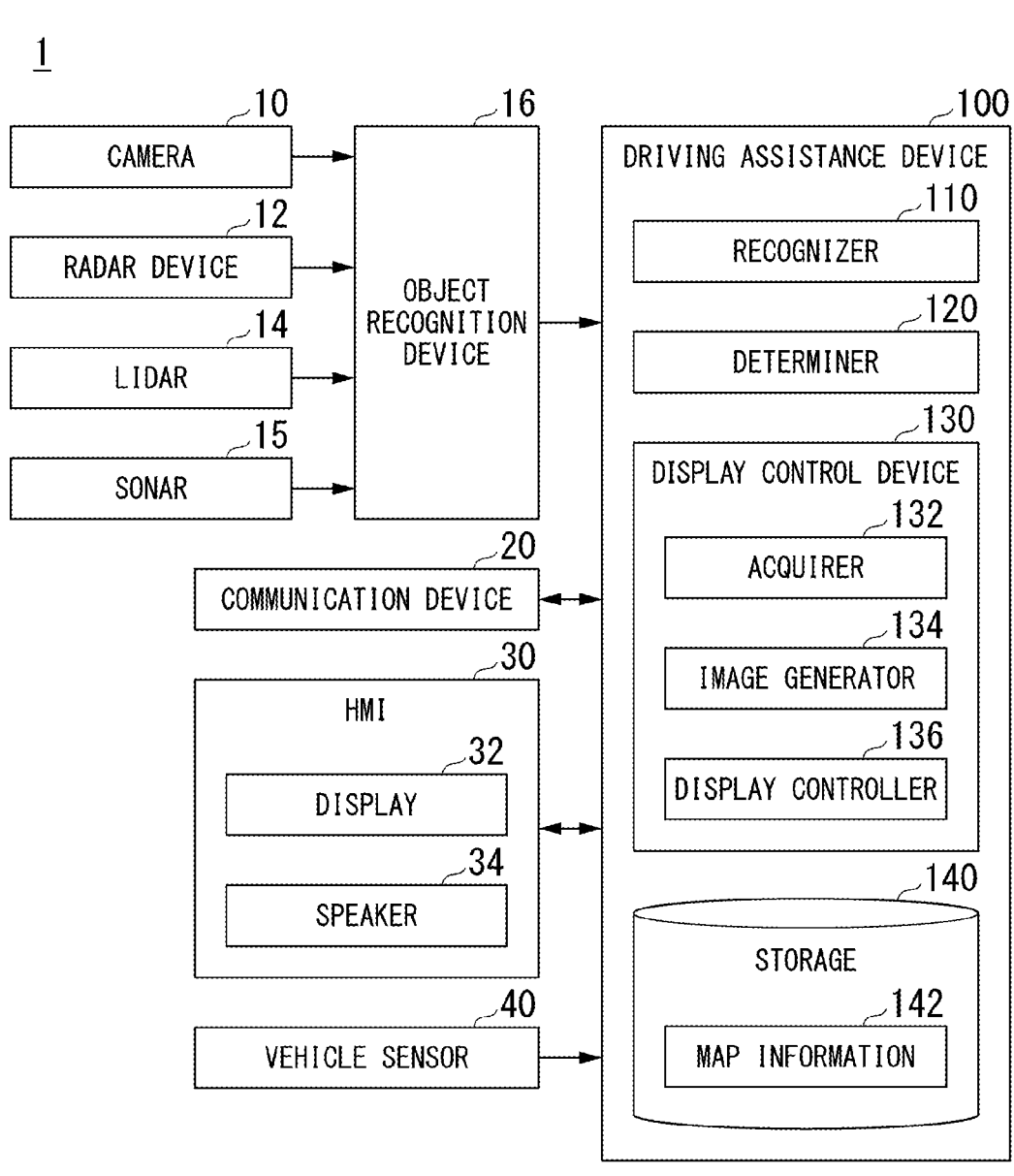
FIG. 1 is a configuration diagram of a vehicle system equipped with a display control device according to a first embodiment.

FIG. 1 is a configuration diagram of a vehicle system 1 equipped with a display control device according to a first embodiment. A vehicle in which the vehicle system 1 is mounted (hereinafter, referred to as a host vehicle) is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, a sonar 15, an object recognition device 16, a communication device 20, a human machine interface (HMI) 30, a vehicle sensor 40, and a driving assistance device 100. These devices and apparatuses are connected to each other by a multiplex communication line such as a controller area network (CAN) communication line, a serial communication line, a wireless communication network, or the like. Constituents shown in FIG. 1 are merely an example, and a part of the constituents may be omitted or another constituent may be added. The HMI 30 is an example of an "output."

The camera 10 is a digital camera that uses a solid-state image sensor such as a charge coupled device (CCD) or a complementary metal oxide semiconductor (CMOS). The camera 10 is attached to an arbitrary place on a host vehicle in which the vehicle system 1 is mounted. When an image of the front is captured, the camera 10 is attached to an upper part of the front windshield, a back surface of the windshield rear-view mirror, and the like. The camera 10 periodically and repeatedly captures, for example, a periphery of the host vehicle. The camera 10 may be a stereo camera.

The radar device 12 emits radio waves such as millimeter waves around the host vehicle and detects radio waves reflected by an object (reflected waves) to detect at least a position (a distance and a direction) of the object. The radar device 12 is attached to arbitrary place on the host vehicle. The radar device 12 may detect the position and a speed of the object using a frequency modulated continuous wave (FM-CW) method.

The LIDAR 14 irradiates a periphery of the host vehicle with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the host vehicle. The LIDAR 14 detects a distance from the host vehicle to the target by performing scanning in horizontal and vertical directions with respect to a traveling direction of the host vehicle.

The sonar 15 detects a distance to an object, a position thereof, or the like by emitting ultrasonic waves around the host vehicle and detecting reflection or scattering by the object present within a predetermined distance from the host vehicle. The sonar 15 is provided at, for example, a front end and a rear end of the host vehicle, and on a bumper or the like.

The object recognition device 16 performs sensor fusion processing on results of the detection by some or all of the camera 10, the radar device 12, the LIDAR 14, and the sonar 15, and recognizes the position, type, speed, and the like of the object. The object recognition device 16 outputs results of the recognition to the driving assistance device 100. The object recognition device 16 may output the results of the detection by the camera 10, the radar device 12, the LIDAR 14, and the sonar 15 to the driving assistance device 100 as they are. The object recognition device 16 may be omitted from the vehicle system 1 by incorporating a function of the object recognition device 16 into the driving assistance device 100.

The communication device 20 communicates with, for example, a terminal device of a user (occupant) using the host vehicle, or various server devices using, for example, a cellular network, a Wi-Fi network, a Bluetooth (a registered trademark), dedicated short range communication (DSRC), a local area network (LAN), a wide area network (WAN), or a network such as the Internet.

The HMI 30 presents various types of information to an occupant of the host vehicle and receives an input operation by the occupant. The HMI 30 includes, for example, a display 32 and a speaker 34. The display 32 may be, for example, a display device provided in a meter or at a center of an instrument panel, or a head-up display (HUD). The speaker 34 may be, for example, an audio output device provided in a compartment of the host vehicle. In addition to the display 32 and the speaker 34, the HMI 30 may include a buzzer, a touch panel, a switch, a key, a microphone, and the like.

The vehicle sensor 40 includes a vehicle speed sensor that detects a speed of the host vehicle M, an acceleration sensor that detects acceleration, a yaw rate sensor that detects a yaw rate (for example, a rotational angular speed around a vertical axis passing through a center of gravity of the host vehicle), and an azimuth sensor that detects a direction of the host vehicle M, and the like. The vehicle sensor 40 may be provided with a position sensor that detects the position of the host vehicle. The position sensor is, for example, a sensor that acquires position information (longitude and latitude information) from a global positioning system (GPS) device. The position sensor may be a sensor that acquires position information using a global navigation satellite system (GNSS) receiver.

The driving assistance device 100 is a device that assists a driver in driving the host vehicle. The driving assistance device 100 includes, for example, a recognizer 110, a determiner 120, a display control device 130, and a storage 140. The recognizer 110, the determiner 120, and the display control device 130 are each realized by a hardware processor such as a central processing unit (CPU) executing a program (software). Some or all of these components may be realized by hardware (a circuit part; including circuitry) such as large scale integration (LSI), an application specific integrated circuit (ASIC), a field-programmable gate array (FPGA), and a graphics processing unit (FPGA), and a graphics processing unit (GPU), or may be realized by software and hardware in cooperation. A program may be stored in advance in a storage device (a storage device having a non-transitory storage medium) such as an HDD or a flash memory of the driving assistance device 100, or may be stored in a detachable storage medium such as a DVD or a CD-ROM and installed in the HDD or the flash memory of the driving assistance device 100 by the storage medium (non-transitory storage medium) being attached to a drive device.

The storage 140 may be realized by the various storage devices described above, an electrically erasable programmable read only memory (EEPROM), a read only memory (ROM), a random access memory (RAM), or the like. The storage 140 stores, for example, information, programs, and various other types of information necessary to execute various types of control in the first embodiment. The storage 140 may include map information 142. The map information 142 is, for example, information in which road shapes are expressed by links indicating a road in a predetermined section and nodes connected by the links. The map information 142 may include point of interest (POI) information or may include information regarding road shapes, road structures, and the like. Road shapes include, for example, branching and merging, a tunnel (an entrance and an exit), a curved road (an entrance and an exit), a curvature, a radius of the curvature, the number of lanes, a width, a slope, and the like of a road or a road marking line (hereinafter referred to as a "marking line"). The information regarding road structures may include information such as types, positions, orientations with respect to an extension direction of a road, sizes, shapes, and colors of road structures. For the types of road structures, for example, marking lines may be set to one type, and lane marks that belong to the marking lines, curbs, and median strips may each be set to different types. The map information 142 may be updated at any time by the communication device 20 communicating with an external device.

The recognizer 110 recognizes surrounding conditions of the host vehicle on the basis of information input from at least one of the camera 10, the radar device 12, the LIDAR 14, and the sonar 15, or information input via the object recognition device 16. For example, the recognizer 110 recognizes the host vehicle and states such as a type, a position (relative position), a size (including a width), a speed (relative speed), and acceleration of an object present around (within a predetermined distance from) the host vehicle. The type of an object may be, for example, whether the object is a type such as a vehicle, a pedestrian, a utility pole, or the like, or may be a type for identifying each vehicle. The position of an object may be recognized as, for example, a position of an absolute coordinate system (hereinafter referred to as a vehicle coordinate system) with the origin at a representative point (a center of gravity, a drive shaft center, or the like) of the host vehicle. The position of an object may be represented by a representative point such as the center of gravity, a corner, or a tip in a traveling direction of the object, or may be represented by an expressed area. For example, when the object is a mobile object such as another vehicle, the "state" of the object may include the acceleration, a jerk, or a "behavior state" (for example, whether it is changing lanes or is intending to change lanes) of the object.

Among the recognized objects, the recognizer 110 recognizes an object that is present in a traveling path in front of the host vehicle (for example, in a traveling direction of the host vehicle and within a predetermined distance from the host vehicle) as an obstacle. The recognizer 110 may not recognize an object that meets a predetermined condition, such as a vehicle traveling in front of the host vehicle, as an obstacle even if the object is present in front of the host vehicle (for example, an object whose change amount in a relative distance or relative speed in a predetermined time is less than a threshold value). The recognizer 110 may recognize whether the obstacle is a dynamic obstacle that is moving, such as an oncoming vehicle or a pedestrian, or a static obstacle that is currently stationary, such as a utility pole, a parked vehicle, or an abandoned object.

The recognizer 110 recognizes conditions of a road on which the host vehicle is traveling. The conditions of the road include a position, a shape, the number of lanes, a width, a curvature, and the like of a road boundary such as a marking line that divides the road. The recognizer 110 may recognize a distance between the recognized object around the host vehicle and the road boundary. The recognizer 110 may refer to the map information 142 on the basis of the position information of the host vehicle recognized by the vehicle sensor 40, and may recognize the conditions of the road by extracting information indicating conditions of a road around the host vehicle included in the map information 142, or may recognize the conditions of the road on which the host vehicle is traveling by collating a recognition result from the map information 142 with a recognition result from the camera 10.

The determiner 120 determines whether there is a possibility that the host vehicle and the obstacle will come into contact with each other in the future, on the basis of a result of the recognition by the recognizer 110, and states of the host vehicle and the obstacle set in advance. When the determiner 120 determines that there is a possibility that the host vehicle and the obstacle will come into contact with each other in the future, the determiner 120 determines from which of left and right sides the obstacle is approaching the host vehicle. The determiner 120 may determine whether the host vehicle can pass next to the obstacle on the basis of the road conditions. In this case, the determiner 120 determines whether the host vehicle can pass next to the obstacle without coming into contact on the basis of the distance between a marking line that divides the traveling path (for example, the road) of the host vehicle and an obstacle present in front of the host vehicle, which are recognized by the recognizer 110. Details of functions of the determiner 120 will be described below.

The display control device 130 generates an image indicating predetermined information on the basis of a result of the recognition by the recognizer 110 and a result of the determination by the determiner 120, and causes the display 32 to display the generated image. The display control device 130 includes, for example, an acquirer 132, an image generator 134, and a display controller 136.

The acquirer 132 acquires information on the surrounding conditions of the host vehicle recognized by the recognizer 110. The acquirer 132 acquires information on the result of the determination by the determiner 120.

The image generator 134 generates various images to be displayed on the display 32 on the basis of the information acquired by the acquirer 132. For example, the image generator 134 generates a first image indicating the position of the host vehicle in the traveling path (road) of the host vehicle, a second image indicating the position of an object present within a predetermined distance from the host vehicle, and a third image indicating that the host vehicle and the object are approaching each other.

The image generator 134 generates an image indicating information related to traveling of the host vehicle, such as information on the state of the host vehicle and driving assistance information. The information on the state of the host vehicle includes, for example, information such as a speed, an engine speed, and a shift position of the host vehicle. The driving assistance information includes, for example, information that assists with a steering operation and a speed operation by the occupant to avoid a contact between the host vehicle and an obstacle. The driving assistance information may include, for example, information indicating whether the host vehicle can travel in the traveling path ahead, information on a future traveling route, and the like. The image generator 134 may generate a sound corresponding to content of the generated image.

The display controller 136 causes the display 32 to display the image generated by the image generator 134. The display controller 136 causes the speaker 34 to output the sound generated by the image generator 134. The display controller 136 may output the image and sound generated by the image generator 134 to the occupant of the host vehicle via the communication device 20.

[Determiner]

Figure 2:
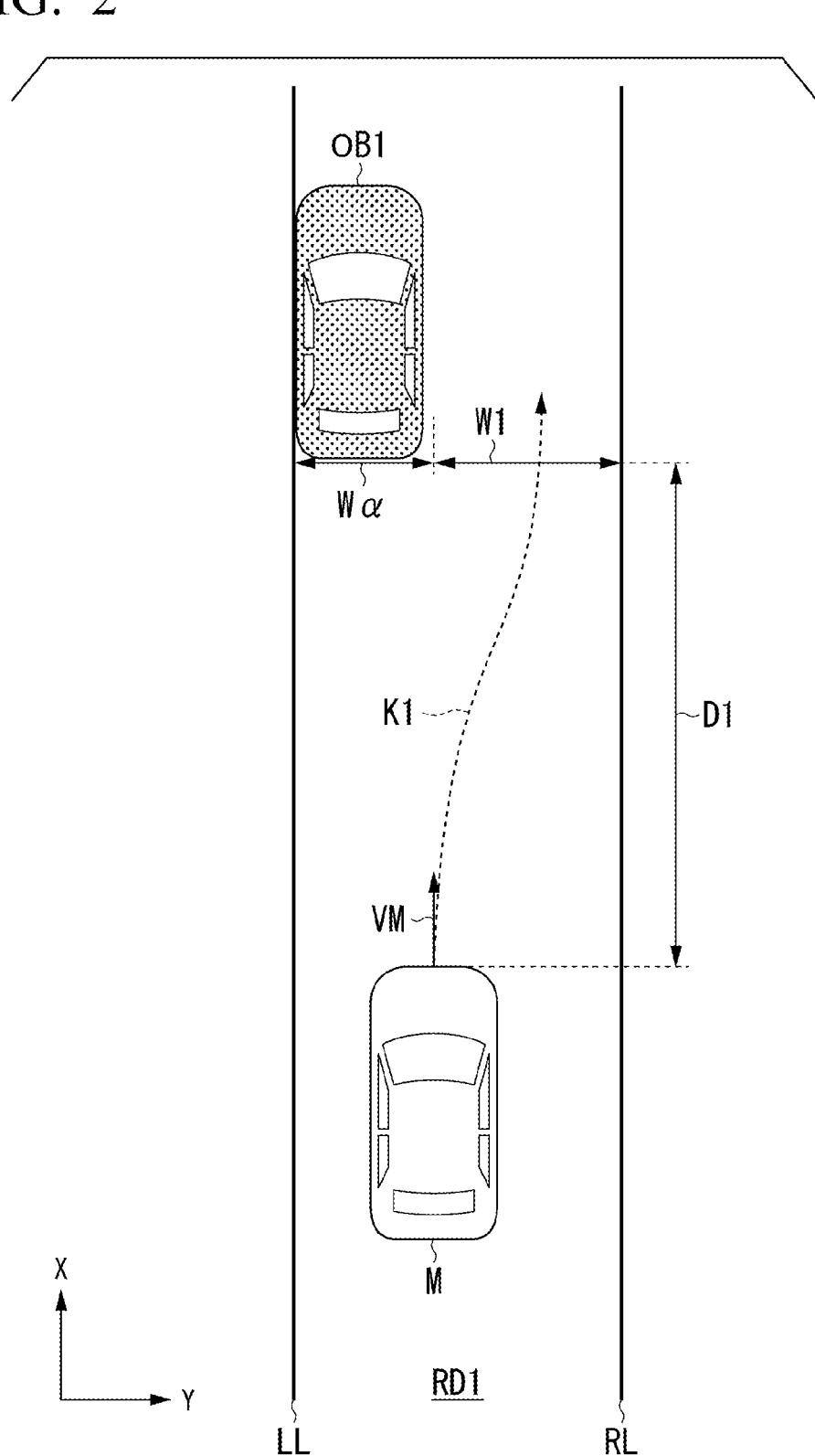
FIG. 2 is a diagram for describing determination processing.

Next, the determination processing by the determiner 120 will be specifically described. FIG. 2 is a diagram for describing determination processing. In the example of FIG. 2, the host vehicle M is traveling at a speed VM in an extending direction (an X-axis direction in FIG. 2) of a road RD1 divided by marking lines LL and RL. In the example of FIG. 2, it is assumed that there is a parked vehicle OB1 parked on a left side of the road RD1 in the traveling direction (forward) of the host vehicle M.

In the example of FIG. 2, the recognizer 110 recognizes a position of the host vehicle M on the road RD1, a position, a shape, and a width of the road RD1 (marking lines LL and RL), and the like. The recognizer 110 recognizes the parked vehicle OB1 as an obstacle, for example, when a distance D1 between the host vehicle M and the parked vehicle OB1 is within a predetermined distance. The recognizer 110 recognizes that the parked vehicle OB1 is a static obstacle and that the parked vehicle OB1 is present at a left front of the host vehicle M.

The determiner 120 determines whether there is a possibility that the host vehicle M and the parked vehicle OB1 will come into contact with each other in the future based on a result of the recognition described above. For example, the determiner 120 determines, on the basis of a predicted future movement trajectory (a first predicted movement trajectory) based on a position and a speed of the host vehicle M and a position and a size of the parked vehicle OB1, that there is a possibility that the host vehicle M and the parked vehicle OB1 will come into contact with each other when the first predicted movement trajectory overlaps (or comes in contact with) the parked vehicle OB1, and determines that there is no possibility of contact when they do not overlap (or do not come into contact with) each other. When the obstacle is a dynamic obstacle such as a moving person or a bicycle, the determiner 120 may also determine whether there is a possibility that the host vehicle M and the dynamic obstacle will come into contact with each other in the future depending on whether a predicted future movement trajectory (a second predicted movement trajectory) based on a position and a speed of the dynamic obstacle and the first predicted movement trajectory overlap (or come in contact with) each other.

The determiner 120 calculates a margin time TTC until the host vehicle M comes into contact with the parked vehicle OB1, on the basis of a relative distance and a relative speed of the parked vehicle OB1 with respect to the host vehicle M. A margin time TTC1 is calculated by, for example, dividing the relative distance by the relative speed. Then, the determiner 120 determines that there is a possibility that the host vehicle M and the parked vehicle OB1 will come into contact with each other when the calculated margin time TTC is within a predetermined time, and determines that there is no possibility that the host vehicle M and the parked vehicle OB1 will come into contact with each other when the margin time TTC is greater than the predetermined time.

The determiner 120 determines from which of the left and right sides the parked vehicle OB1 is approaching the host vehicle M when it is determined that there is a possibility that the host vehicle and the parked vehicle OB1 will come into contact with each other in the future. In the example of FIG. 2, the determiner 120 determines that the parked vehicle OB1 is approaching the host vehicle M from the left side.

When the determiner 120 determines that there is a possibility that the host vehicle M and the parked vehicle OB1 will come into contact with each other in the future, the determiner 120 determines whether the host vehicle can pass next to the parked vehicle OB1 on the basis of conditions of the road RD1. In this case, the determiner 120 derives a width W1 within which the host vehicle M can travel on the basis of, for example, a width of the road RD1 recognized by the recognizer 110 and a width of the parked vehicle OB1. The width W1 is calculated by, for example, subtracting a width Wα obtained by adding a margin of a predetermined amount to the width of the parked vehicle OB1 from the width of the road RD1. The amount of the margin may vary depending on the speed of the host vehicle M and a road shape, or may be a fixed value. The amount of the margin may vary depending on whether the obstacle is a dynamic or static obstacle. Furthermore, in a case of a dynamic obstacle, the amount of the margin varies depending on the speed and type of the dynamic obstacle (for example, a person or a bicycle). The determiner 120 determines that the host vehicle M can pass next to the parked vehicle OB1 when the derived width W1 is greater than the width of the host vehicle M, and determines that the host vehicle M cannot pass next to the parked vehicle OB1 when the width W1 is equal to or less than the width of the host vehicle. When the recognizer 110 recognizes a travelable area of the host vehicle M outside a marking line RL as viewed from the host vehicle M, the determiner 120 may also use a width obtained by adding the width and a width of the travelable area instead of the width of the road RD1.

When the determiner 120 determines that the host vehicle M can pass next to the parked vehicle OB1, the determiner 120 may generate a route K1 for the host vehicle passing next to the parked vehicle OB1 from a current position of the host vehicle M.

[Display Control Device]

Next, the image displayed on the display 32 by the display control device 130 will be specifically described. The image shown below is an image generated by the image generator 134 based on a result of the recognition by the recognizer 110 and a result of the determination by the determiner 120 in a situation shown in FIG. 2 described above. In addition, several different display modes will be described below.

<First Display Mode>

Figure 3:
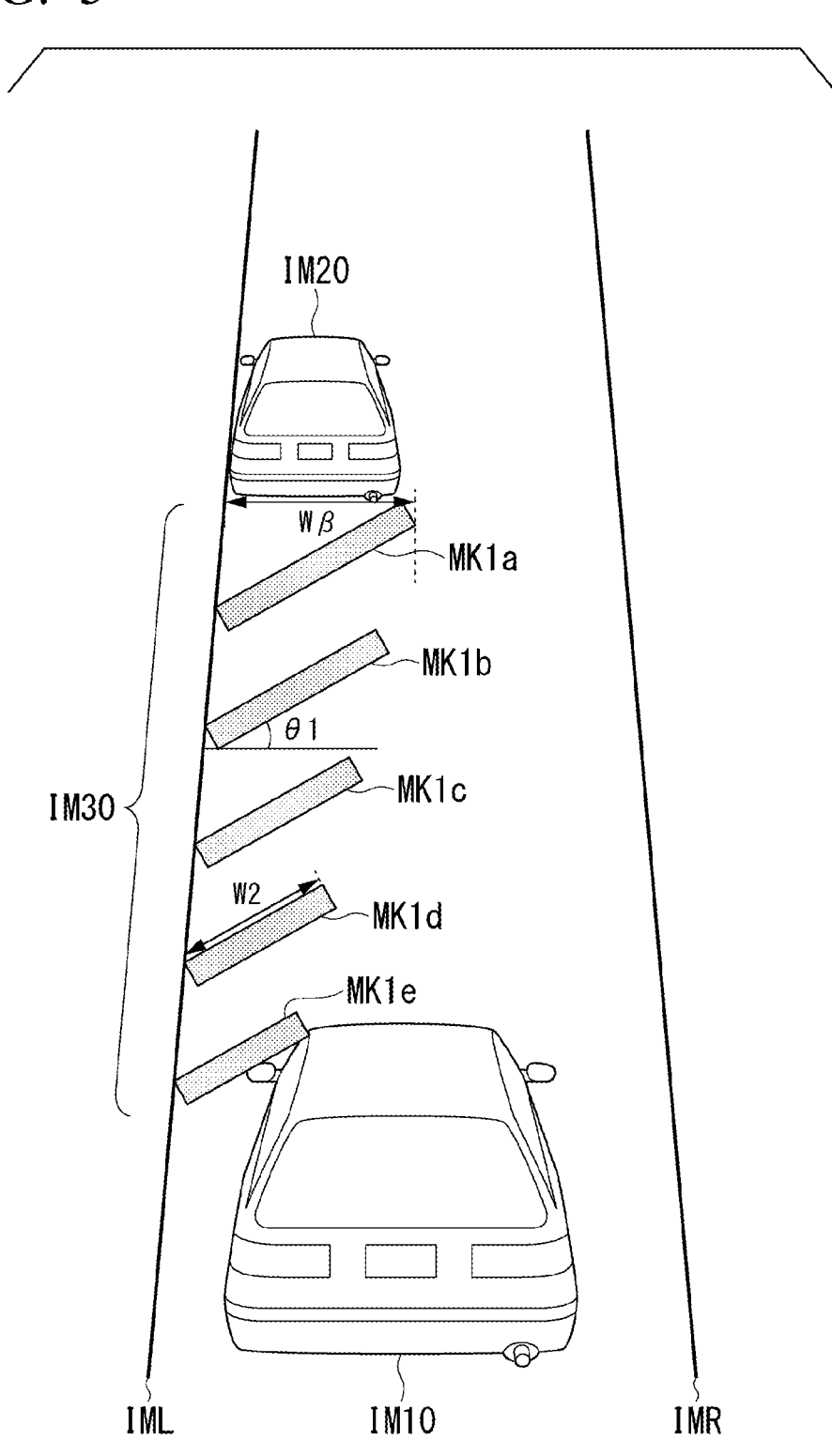
FIG. 3 is a diagram for describing a first display mode.

FIG. 3 is a diagram for describing a first display mode. In the first display mode shown in FIG. 3, marking line images IML and IMR corresponding to the marking lines LL and RL that divide the traveling path (road RD1) on which the host vehicle M travels, a first image IM10 corresponding to the host vehicle M, a second image IM20 corresponding to the parked vehicle OB1 which is an obstacle, and a third image IM30 indicating that the host vehicle M and the parked vehicle OB1 are approaching each other are shown. The first image IM10 and the second image IM20 may be images resembling vehicles, or each may be an identifiable mark or the like. The third image IM30 may be generated when the determiner 120 determines that there is a possibility that the host vehicle M and the parked vehicle OB1 will come into contact with each other in the future. The image generator 134 may generate each image as one image, or may super-impose each image.

The image generator 134 causes each image to be displayed at a position corresponding to position information of the other. The image generator 134 adjusts a size of the image depending on a distance from the host vehicle M. For example, the image generator 134 may adjust the second image IM20 to be smaller and a width of a road to be narrower as the distance from the host vehicle M increases.

Here, the third image IM30 includes, for example, an image indicating from which of the left and right sides the parked vehicle OB1 is approaching the host vehicle M. For example, the third image IM30 is displayed at a position between the first image IM10 and the second image IM20. In the first display mode, the third image IM30 is drawn as a diagonal line by a plurality of mark images MK1 that are continuous at predetermined intervals in the traveling direction of the host vehicle M. The predetermined interval may vary depending on a speed VM of the host vehicle M, a relative distance to the parked vehicle OB, a road shape, and the like, or may be a fixed interval. In the example of FIG. 3, mark images MK1$a$ to MK1$e$ are shown, but the number of mark images MK1 in the first embodiment is not limited to this.

For example, the image generator 134 generates mark images MK1$a$ to MK1$e$ extending from the marking line image IML in a movement direction (diagonally right forward along a road in the example of FIG. 3) for the host vehicle M to avoid contact with the parked vehicle OB1. An angle $\theta1$ of the mark images MK1$a$ to MK1$e$ in an extending direction with respect to a road width direction may be a fixed angle, or may be variably set according to the speed of the host vehicle M1, the relative distance between the host vehicle M and the parked vehicle OB1, the margin time TTC, the road shape, and the like. The angle $\theta1$ may be set for each mark images MK1$a$ to MK1$e$. As a result, the mark images MK1$a$ to MK1$e$ indicate a direction in which the host vehicle M needs to move to avoid contact with the parked vehicle OB1, so that the occupant (driver) of the host vehicle M can smoothly perform a steering operation or the like to move to a right side of the road RD1.

The mark images MK1$a$ to MK1$e$ forming the diagonal line may have a width W2 (lengths of the mark images MK1$a$ to MK1$e$ in the extending direction) changed depending on a size of the parked vehicle OB1. In this case, the diagonal line formed by the mark images MK1$a$ to MK1$e$ is displayed such that the width W2 becomes longer at a position closer to the parked vehicle OB1. For example, the image generator 134 sets a width of a mark image MK1$a$ closest to the parked vehicle OB1 (a width of a road divided by the marking lines image IML and IMR in FIG. 3 in a lateral direction) WB to a length corresponding to a width W$\alpha$ obtained by adding a margin of a predetermined amount to the width of the parked vehicle OB1 described above, and generates mark images MK1$b$ to MK1$e$ whose widths are changed to become shorter gradually (or stepwise) as a distance is closer to the host vehicle M based on the length.

The display controller 136 causes the display 32 to display a third image IM30 as shown in FIG. 3 in addition to the first image IM10 and the second image IM20. As a result, it is possible to make it easier for the occupant (driver or the like) of the host vehicle M to ascertain that there is a possibility that the host vehicle M and the parked vehicle OB1 are approaching each other, and that the parked vehicle OB1 is approaching the host vehicle M from the left side according to the first display mode. According to the first display mode, it is possible to prompt the driver of the host vehicle M to focus on an area with low risk by adjusting a direction and a length of the diagonal line. Therefore, the driver can perform a driving operation (a steering operation and a speed operation) to avoid contact with the parked vehicle OB1 at an early stage. For example, the driver can easily and reliably cause the host vehicle M to avoid contact with the parked vehicle OB by driving the host vehicle M so as not to pass over the mark images MK1$a$ to MK1$e$.

The image generator 134 may generate an image corresponding to the route K1 when the determiner 120 determines that the host vehicle M can pass next to the parked vehicle OB1. In this case, the display controller 136 causes the display 32 to display the image corresponding to the route K1 in addition to the first image IM10 to the third image IM30 described above. In addition to the mark images MK1$a$ to MK1$e$, the display controller 136 may cause an image indicating the relative distance between the host vehicle M and the parked vehicle OB1, or an image prompting the user to move to the right side of the road to be displayed as the third image IM30.

The display controller 136 performs control of changing colors of the mark images MK1$b$ to MK1$e$ and switching between blinking and lighting according to the relative distance between the host vehicle M and the parked vehicle OB1, the speed VM of the host vehicle M, the road shape, or the like. In this case, for example, as the possibility of contact between the host vehicle M and the parked vehicle OB1 increases (for example, as the relative distance or the margin time TTC is shortened), the mark images MK1$a$ to MK1$e$ are controlled to be highlighted more.

In the example of FIG. 3, since the obstacle (the parked vehicle OB1) is present on the left side of the host vehicle M (on a side of the marking line LL) as shown in FIG. 2, mark images MK1$a$ to MK1$e$ are displayed which indicate that the obstacle is approaching the host vehicle M from the left side, but when the obstacle is present on the right side of the host vehicle M (on a side of the marking line RL), a mark image is displayed which indicates that the obstacle is approaching the host vehicle M from the right side. In this case, the second image IM20 and the third image IM30 are displayed in a display mode in which the left and right sides of the host vehicle M are reversed in the content described above. In other words, the second image IM20 corresponding to the obstacle is displayed at a position close to the marking line image IMR on the right side of the traveling lane of the host vehicle M, and furthermore, mark images MK1$a$ to MK1$e$, which are the third image IM30, are displayed to extend diagonally forward to the left from a display position of the marking line image IMR. For the display modes below, a case in which the obstacle is approaching from the left side of the host vehicle M will be described, but when the obstacle is approaching from the right side of the host vehicle M, the left and right can be similarly read in reverse.

<Second Display Mode>

Figure 4:
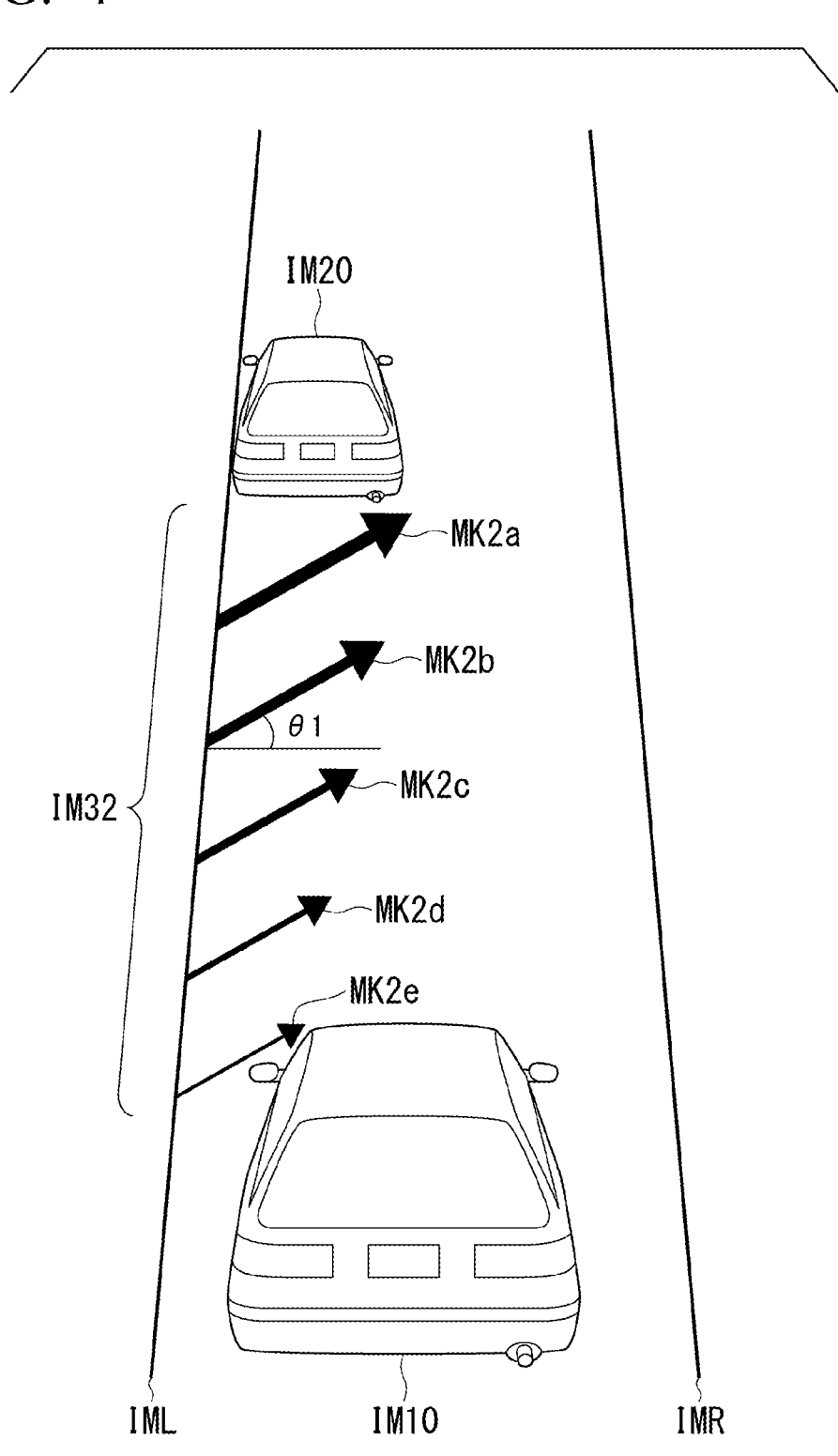
FIG. 4 is a diagram for describing a second display mode.

FIG. 4 is a diagram for describing a second display mode. As shown in FIG. 4, the second display mode is different from the first display mode in that a third image IM32 is displayed instead of the third image IM30, and arrow-shaped mark images MK2a to MK2e are displayed as the third image IM32 instead of the mark images MK1a to MK1e of the third image IM30. In the following description, the difference will be mainly described, and other descriptions will be omitted. The same applies to descriptions of display modes below.

In the second display mode, a direction of each arrow of the mark images MK2a to MK2e indicates a direction in which the host vehicle M needs to move (a direction in which the host vehicle avoids contact with the parked vehicle OB1). In the second display mode, as in the first display mode, the widths may be adjusted depending on positions of the mark images MK2a to MK2e, and the angle θ1 of each of the mark images MK2a to MK2e may be set.

In the second display mode, the image generator 134 may adjust the thickness according to the position where each of the mark images MK2a to MK2e is displayed. In the example of FIG. 4, the mark image MK2 is adjusted to be displayed thicker as the display position is closer to another vehicle M (in other words, it is farther from the host vehicle M). As a result, it is possible to make it easier for the occupant to ascertain that the possibility of contact increases at a position closer to the parked vehicle OB1, and it is possible to prompt the occupant to take early avoidance driving before approaching the parked vehicle OB1.

According to the second display mode described above, in addition to having the same effect as the first display mode, it is possible to notify the occupant of the host vehicle M of the direction in which the host vehicle M needs to move more clearly than in the first display mode.

<Third Display Mode>

Figure 5:
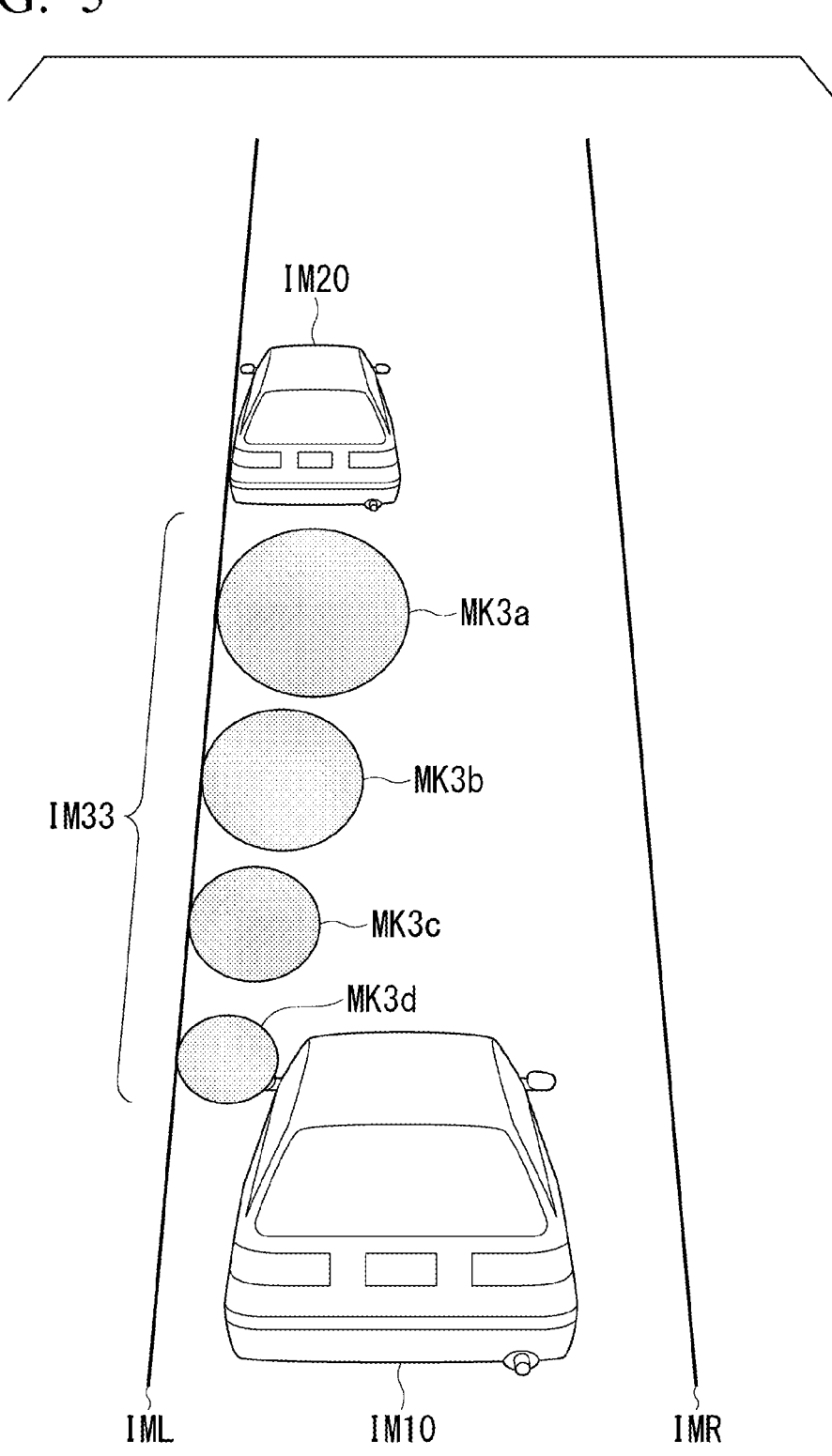
FIG. 5 is a diagram for describing a third display mode.

FIG. 5 is a diagram for describing a third display mode. As shown in FIG. 5, the third display mode is different from the first display mode in that a third image IM33 is displayed instead of the third image IM30, and circular mark images MK3a to MK3d are displayed as the third image IM33 instead of the mark images MK1a to MK1e of the third image IM30.

In the third display mode, the image generator 134 adjusts a diameter of the circular shape according to positions of the mark images MK3a to MK3d. The diameter may be adjusted, for example, using the same method as adjustment of a width of the mark images MK1a to MK1e in the first display mode.

According to the third display mode described above, since a mark image MK3 is circular, its size can be adjusted not only in a horizontal direction (a road width direction) but also in a vertical direction (the traveling direction of the host vehicle M) by adjusting the diameter. Therefore, it is possible to make it easier for the occupant of the host vehicle M to ascertain a difference in the mark image MK3. Therefore, it is possible to prompt the occupant to perform early avoidance driving before approaching the parked vehicle OB1.

<Fourth Display Mode>

Figure 6:
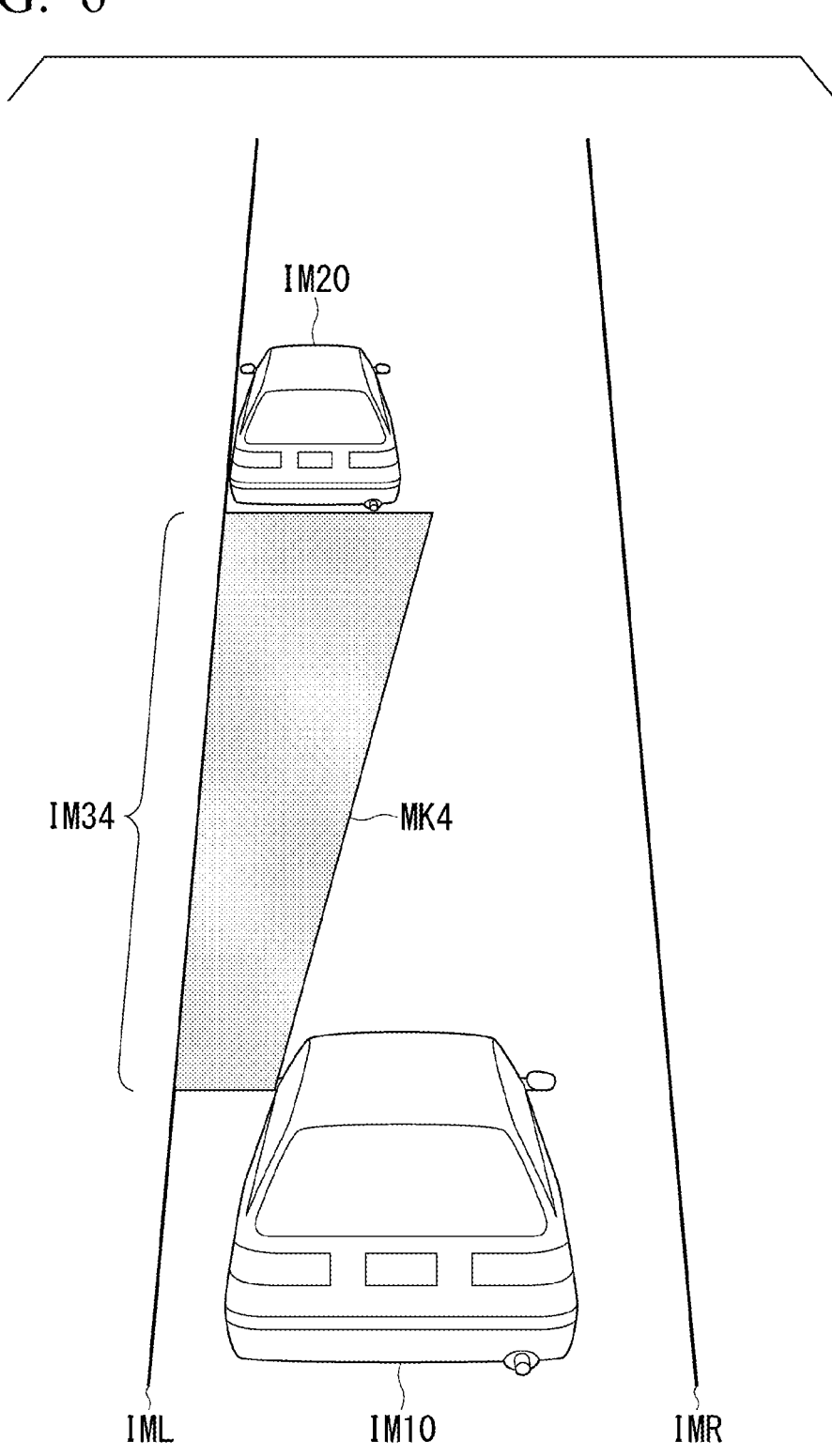
FIG. 6 is a diagram for describing a fourth display mode.

FIG. 6 is a diagram for describing a fourth display mode. As shown in FIG. 6, the fourth display mode is different from the first display mode in that a third image IM34 is displayed instead of the third image IM30, and one mark image MK4 is displayed as the third image IM34 instead of the mark images MK1a to MK1e of the third image IM30.

In the fourth display mode, a left side of the mark image MK4 is in contact with the marking line image IML. The mark image MK4 is adjusted so that its width becomes longer as it approaches the parked vehicle OB1.

According to the fourth display mode described above, using the mark image MK4, it is possible to make it easier for the occupants of the mobile object M to ascertain more clearly an area where there is a possibility that the host vehicle M will come into contact with the parked vehicle OB1 when the host vehicle M travels (in other words, there is no possibility that the host vehicle M will come into contact with the parked vehicle OB1).

<Fifth Display Mode>

Figure 7:
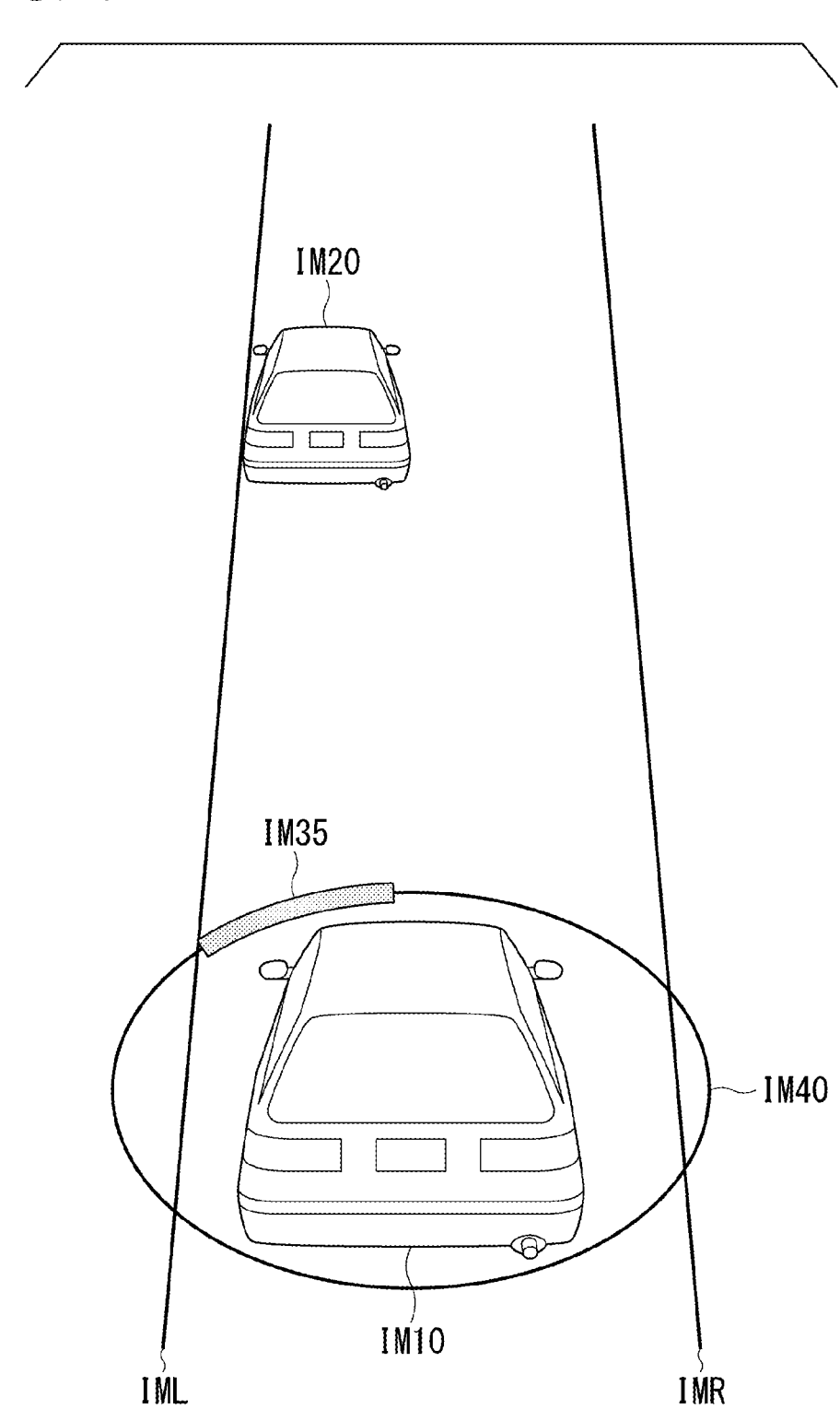
FIG. 7 is a diagram for describing a fifth display mode.

FIG. 7 is a diagram for describing a fifth display mode. As shown in FIG. 7, the fifth display mode is different from the first display mode in that a third image IM35 is displayed instead of the third image IM30, and a fourth image IM40 is furthermore displayed. The fourth image IM40 is an image which shows a risk area around the host vehicle M. The risk area is, for example, an area where it is determined that there is a high possibility (degree of contact) of the host vehicle M coming into contact with an obstacle (above a threshold value), and may be variably set depending on a speed VB, a behavior, or the like of the host vehicle M and may also be set to a fixed area. The risk area may be an area where the margin time TTC is less than a predetermined time. For example, when an obstacle is present in the risk area, the display controller 136 causes the display 32 to display an image indicating a warning, or causes the speaker 34 to output a warning.

When the image generator 134 generates the fourth image IM40, the display controller 136 causes the fourth image IM40 together with the first image IM10 and the second image IM20 to be displayed, and causes the third image IM35 to be displayed by superimposing it on the fourth image IM40. In this case, the display controller 136 superimposes the third image IM35 on a ring portion of a ring shape indicating the fourth image IM40, which is on the front left side when viewed from the host vehicle M.

According to the fifth display mode described above, using the third image IM35 superimposed on the fourth image IM40 indicating a risk area of the host vehicle M, it is possible to make it easier for the occupant to ascertain that the parked vehicle OB1 is approaching the host vehicle M from the left side.

<Sixth Display Mode>

Figure 8:
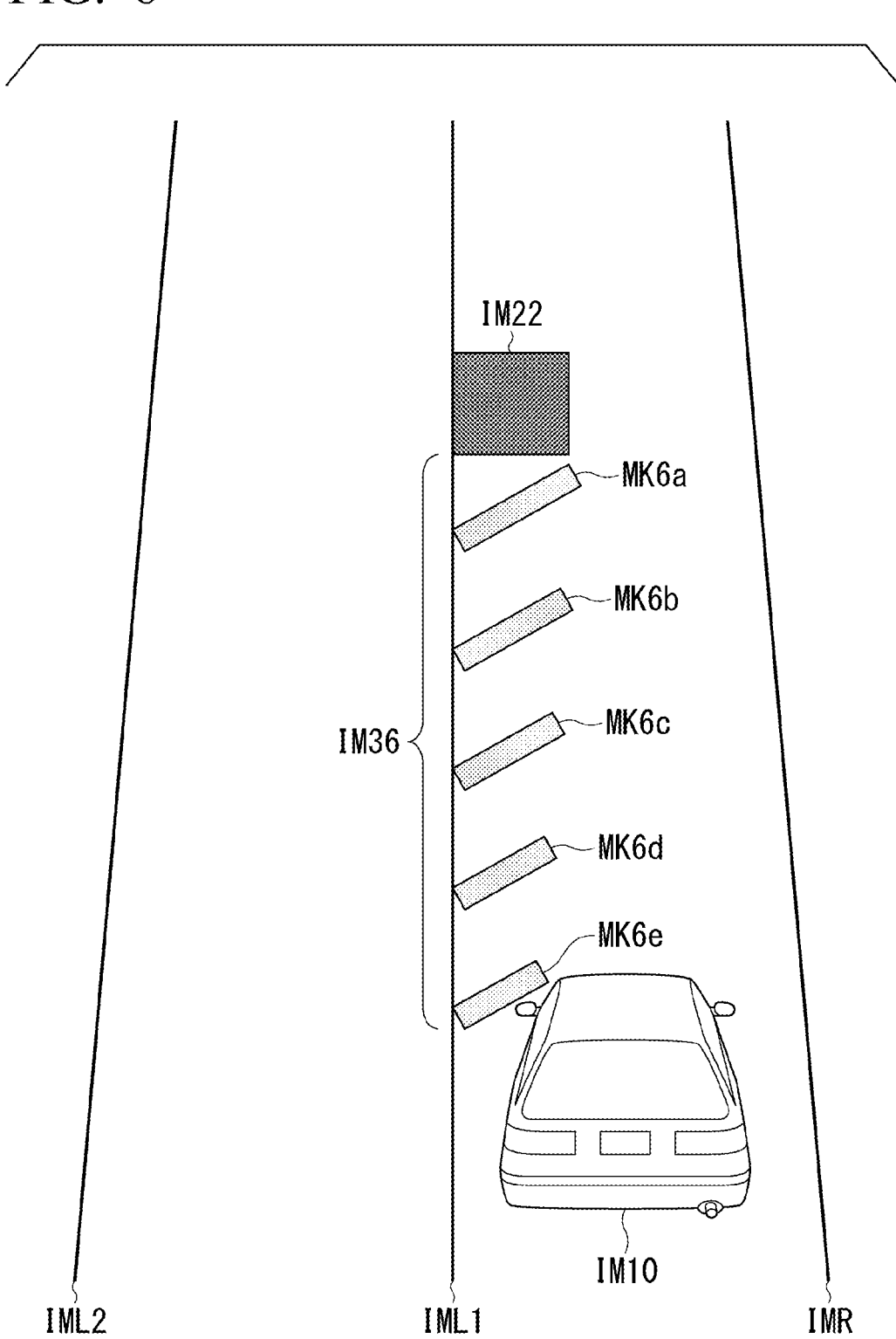
FIG. 8 is a diagram for describing a sixth display mode.

FIG. 8 is a diagram for describing a sixth display mode. An example in FIG. 8 shows a display mode in a situation where the host vehicle M is traveling in a right lane of a two-lane road on which vehicles can travel in the same direction. In the example of FIG. 8, marking line images IML1 and IML2 on the left side and a marking line image IMR on the right side when viewed from the host vehicle M are shown, and furthermore, the first image IM10 and a second image IM22 on a road represented by the marking line images IML1, IML2, and IMR are displayed in association with respective positions thereof. Furthermore, in the example of FIG. 8, mark images MK6a to MK6e having the same shape as in the first display mode are displayed at positions between the first image IM10 and the second image IM22. Here, it is assumed that the second image IM22 is an image corresponding to an abandoned object present in the traveling path in front of the host vehicle M.

In the display mode of FIG. 8, the display controller 136 displays a third image IM36 (mark images MK6a to MK6e) in an area corresponding to the traveling lane of the host vehicle M. As a result, even when the host vehicle M is traveling on a road with a plurality of lanes, it is possible to allow the occupant to more accurately ascertain only information about an obstacle approaching on the traveling lane.

Each of the first to sixth display modes described above may be combined with some or all of the other display modes. For example, the display controller 136 may cause the fourth image IM40 and the third image IM35 shown in the fifth display mode to be displayed, in addition to each of the first to fourth display modes. The display controller 136 may receive settings of the occupant of the host vehicle M from the HMI 30 and switch between the display modes described above. The display controller 136 may also switch between the display modes depending on road conditions and the number of obstacles. For example, in a situation where the host vehicle M is traveling on a narrow road or the like and there is an obstacle on left and right sides of the road, in the case of the first to fourth and sixth display modes, the display of the third image may be annoying. For this reason, the display controller 136 can improve visibility of the third image by switching to the fifth display mode and displaying the third image in the case described above.

When there is no obstacle around the host vehicle M, the display controller 136 displays only the first image IM10 representing the host vehicle M at a corresponding position in a road area indicated by the marking line image. The display controller 136 may display an image indicating the position of an object other than the obstacle as the second image IM20. The display controller 136 causes the first image IM10 and the second image IM20 to be displayed at corresponding positions in the road area without causing the third image to be displayed when the determiner 120 determines that there is no possibility that the host vehicle M and the obstacle (object) will come into contact with each other.

[Processing Flow]

Figure 9:
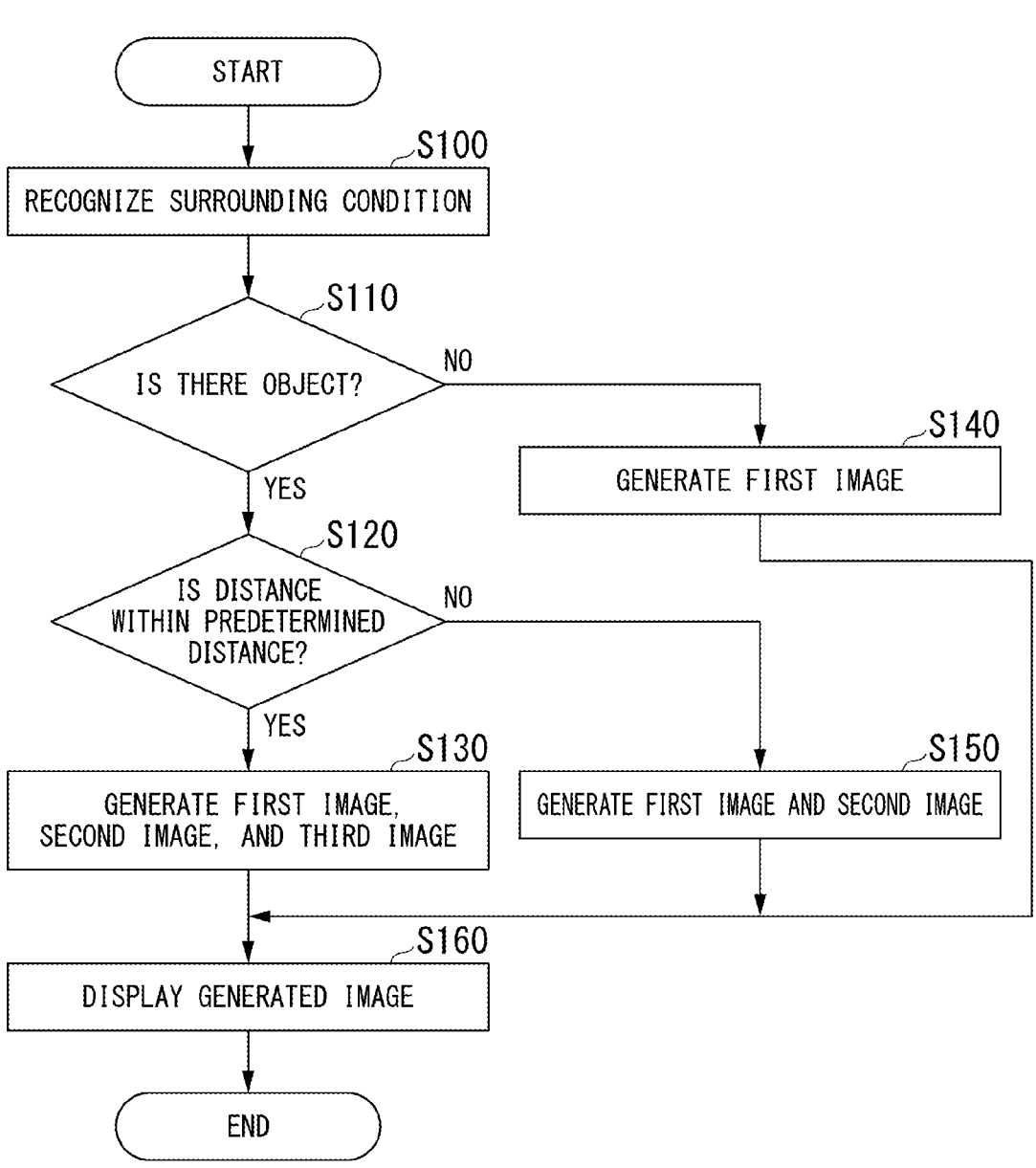
FIG. 9 is a flowchart which shows an example of a flow of a series of processing by the display control device of the first embodiment.

Hereinafter, a flow of a series of processing performed by the display control device 130 will be described using a flowchart. FIG. 9 is a flowchart which shows an example of a flow of a series of processing performed by the display control device 130 of the first embodiment. The processing in FIG. 9 is assumed to be described by including processing related to the driving assistance device 100 equipped with the display control device 130, and furthermore, among various types of processing executed by the display control device 130, display control processing of the first image to the third image will be mainly described. Processing of this flowchart may be repeatedly executed at, for example, a predetermined timing or period.

In the example of FIG. 9, the recognizer 110 recognizes the surrounding conditions of the host vehicle M (step S100). Next, the determiner 120 determines whether an object is present in front of the host vehicle M and in a travel zone (step S110). When it is determined that the object is present, it is determined whether a distance between the mobile object M and the object is within a predetermined distance (step S120). When it is determined that the distance is within the predetermined distance, the image generator 134 of the display control device 130 generates a first image indicating the position of the host vehicle M, a second image indicating the position of an object present within a predetermined distance from the host vehicle M, and a third image indicating that the host vehicle M and the object, which is an obstacle, are approaching each other based on a result of the recognition by the recognizer 110 and a result of the determination by the determiner 120 (step S130). The third image includes an image indicating from which of left and right sides, the object is approaching the mobile object.

In the processing of step S110, when it is determined that an object is not present, the image generator 134 generates a first image (step S140). In the processing of step S120, when it is determined that the distance between the host vehicle M and the object is not within the predetermined distance, the image generator 134 generates a first image and a second image (step S150). After the processing in step S130, S140, or step S150 is completed, the display controller 136 causes the display 32 to display an image generated in the road area of the host vehicle M divided by the marking line images in association with an actual positional relationship (step S160). As a result, processing of this flowchart ends.

MODIFIED EXAMPLE

In the first embodiment, a function of at least one of the recognizer 110 and the determiner 120 may be provided in the display control device 130. In the first embodiment, when it is determined that there is a possibility that the host vehicle M will come into contact with an obstacle that is present directly in front of it, the display control device 130 may cause an image indicating that the host vehicle M is approaching directly from the front to be displayed. In this case, the display control device 130 may cause the display 32 to display it so that it can be identified in a display mode, which is different from the third image indicating from which of left and right sides the obstacle is approaching the host vehicle object M.

In the first embodiment, when there are a plurality of obstacles in front of the host vehicle M, a priority is set for each obstacle, and the image display described above may be performed on the obstacles in a descending order of priority or whose priorities are equal to or higher than a threshold value. In this case, the priority may be set higher as the obstacle is closer to the host vehicle M, and may be set higher as the obstacle is larger. The priority may be higher for dynamic obstacles than for static obstacles, and may be set depending on a type of an obstacle. When a distance between the plurality of obstacles is less than a predetermined distance, each image may be generated by regarding the plurality of obstacles as one obstacle.

The vehicle system 1 of the first embodiment may also be equipped with a driving control device (not shown) that controls one or both of the steering and speed of the host vehicle M to execute driving control of the host vehicle M. In this case, in addition to the image display by the display control device 130, the driving assistance device 100 may execute driving control so that the host vehicle M travels along the route K1 on the basis of a result of the determination described above, or may perform driving control to temporarily stop the host vehicle M or change lanes when it is determined that the host vehicle M cannot pass next to the obstacle.

According to the first embodiment described above, the display control device includes the acquirer 132 configured to acquire the surrounding conditions of a mobile object, and a display controller 136 configured to cause a display 32 to display a first image indicating a position of the mobile object, a second image indicating a position of an obstacle present within a predetermined distance from the mobile object, which is acquired by the acquirer 132, and a third image indicating that the mobile object and the obstacle are approaching each other, in which the third image includes an image indicating from which of left and right sides the obstacle is approaching the mobile object, and thereby it is possible to present more appropriate information to the occupant about how the obstacle is approaching the mobile object. According to the first embodiment, it is possible to present information that triggers a safety behavior such as avoidance driving, reduce the risk of contact with an obstacle, and quickly avoid it in an appropriate direction at an early stage. Therefore, more appropriate driving assistance can be provided to the driver of the host vehicle. According to the first embodiment, it is possible to contribute to the development of a sustainable transportation system.

Second Embodiment

Figure 10:
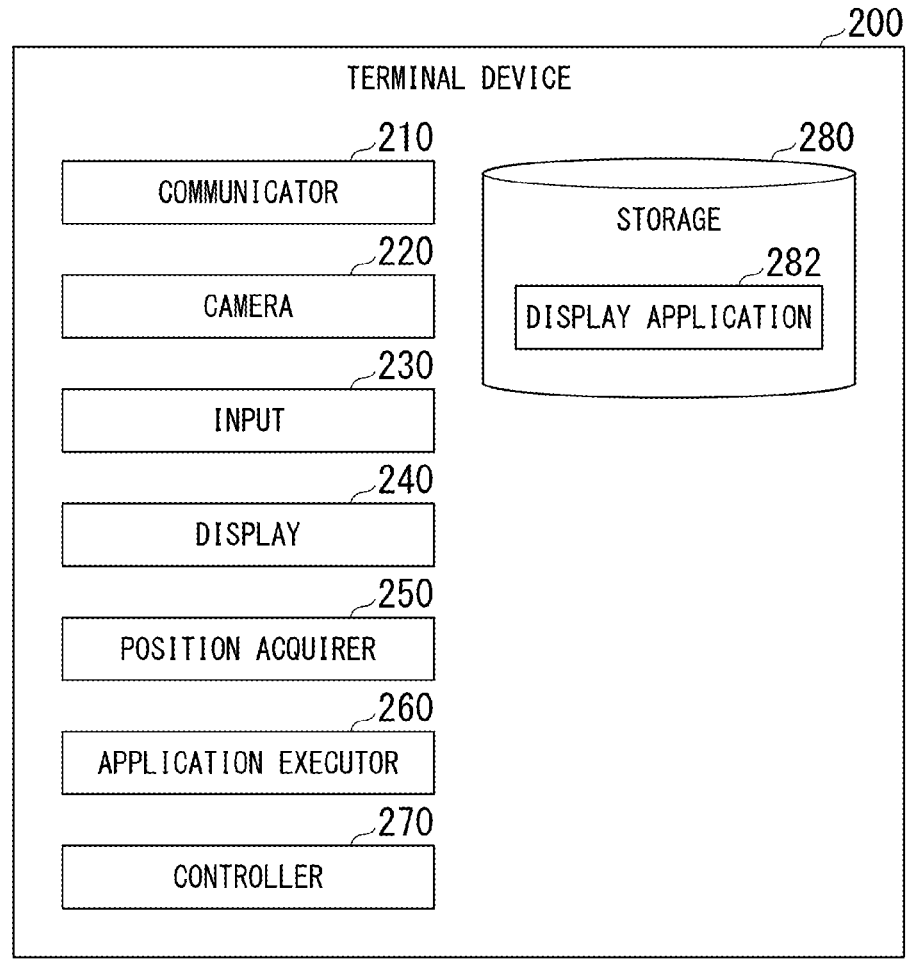
FIG. 10 is a configuration diagram of a terminal device according to a second embodiment.

Next, as a second embodiment, a case will be described in which functions of a display control device are installed in a portable terminal device (for example, a smartphone or a tablet terminal) owned by a user. FIG. 10 is a configuration diagram of a terminal device 200 according to the second embodiment. The terminal device 200 includes, for example, a communicator 210, a camera 220, an input 230, a display 240, a position acquirer 250, an application executor 260, a controller 270, and a storage 280. The position acquirer 250, application executor 260, and controller 270 are each realized by, for example, a hardware processor such as a CPU executing a program (software). Some or all of these components may be realized by hardware (a circuit section; including circuitry) such as LSI, an ASIC, an FPGA, or a GPU, or may be realized by software and hardware in cooperation. The program may be stored in advance in a storage device such as an HDD or flash memory (a storage device equipped with a non-transitory storage medium) included in the terminal device 200, or may be stored in a removable storage medium (non-transient storage medium) such as a DVD or CD-ROM and installed in an HDD or a flash memory of the terminal device 200 by the storage medium being attached to a drive device of the terminal device 200.

The storage 280 may be realized by the various types of storage devices described above, a SSD, an EEPROM, a ROM, a RAM, or the like. The storage 280 stores, for example, a display application 282, a program, and other various types of information. The map information 142 may be stored in the storage 280.

The communicator 210 communicates with an external device, for example, via the same network as the communication device 20 described above.

The camera 220 is, for example, a digital camera that uses a solid-state imaging device such as a CCD or CMOS. For example, while the display application 282 is being executed, the camera 220 captures an image of an area (space) included in an angle of view of the camera in a direction in which the terminal device 200 is directed by the user.

The input 230 receives an input from the user by operating, for example, various keys, buttons, or the like. The input 230 may include, for example, a microphone and receive a sound input from the user. The input 230 may be configured integrally with the display 240 as a touch panel. The display 240 includes, for example, a display and a speaker, and outputs various images (for example, the first image to the fourth image, and the like) in the second embodiment and outputs a sound under control of the application executor 260 and the controller 270.

The position acquirer 250 acquires position information of the terminal device 200 using an embedded GPS device (not shown). The acquired position information includes, for example, latitude and longitude information.

The application executor 260 is realized by executing the display application 282 stored in the storage 280. The display application 282 is, for example, downloaded from an external device via a network and installed on the terminal device 200. The display application 282 is an application program (software) that controls the controller 270 and the like so that the same functions as those of the acquirer 132, the image generator 134, and the display controller 136 described above are executed. The display application 282 may control the controller 270 and the like so that the same function as those of the recognizer 110 and the determiner 120 are executed on the basis of image information captured by the camera 220, information input through the input 230, surrounding information acquired from map information on the basis of the position information of the terminal device 200 acquired by the position acquirer 250, and the like.

The controller 270 controls an entirety of constituents of the terminal device 200. For example, the controller 270 controls contents of the images to be displayed on the display 240 (for example, the first image to the fourth image), display modes (for example, the first display mode to sixth display mode), content of sound output through the speaker, and an output mode by controlling the execution of the display application 282 by the application executor 260. The controller 270 may cause, for example, an image or sound acquired from an external device via the communicator 210 to be output from the display 240, or may also generate an image or sound on the basis of information acquired from the external device and cause it to be output from the display 240. For a series of processing of the terminal device 200 in the second embodiment, for example, the same processing as content of the flowchart shown in FIG. 9 may be applied.

According to the second embodiment described above, the same effects as the first embodiment can be realized even in a terminal device. In other words, according to the second embodiment, it is possible to present information that triggers the user to perform safety behavior to avoid contact (for example, movement of the user), to reduce a risk of contact between the user and an obstacle, and to avoid the obstacle in an appropriate direction at an early stage. Therefore, more appropriate safety behavior assistance can be provided to the user of the terminal device 200.

The embodiments described above can be expressed as follows.

A display control device includes a storage medium configured to store computer-readable instructions and a processor that is connected to the storage medium, in which the processor executes the computer-readable instructions to acquire surrounding conditions of a mobile object, and cause a display to display a first image indicating a position of the mobile object, a second image indicating a position of an obstacle present within a predetermined distance from the mobile object, which is acquired, and a third image indicating that the mobile object and the obstacle are approaching each other, and the third image includes an image indicating from which of left and right sides the obstacle is approaching the mobile object.

Although a mode for carrying out the present invention has been described above using the embodiment, the present invention is not limited to the embodiment, and various modifications and substitutions can be made within a range not departing from the gist of the present invention.

17

What is claimed is:

1. A display control device comprising:

an acquirer configured to acquire surrounding conditions of a mobile object; and a display controller configured to cause a display to display a first image indicating a position of the mobile object, a second image indicating a position of an obstacle present within a predetermined distance from the mobile object, which is acquired by the acquirer, and a third image indicating that the mobile object and the obstacle are approaching each other, wherein the third image includes an image indicating from which of a left side and a right side the obstacle is approaching the mobile object, wherein the third image is displayed between the first image and the second image, and wherein the third image is drawn as a continuous diagonal line in a traveling direction of the mobile object, and the diagonal line is drawn to extend in a movement direction of the mobile object to avoid the obstacle.

2. The display control device according to claim 1, wherein the display controller causes the third image in which a width of the diagonal line has changed depending on a size of the obstacle to be displayed.

3. The display control device according to claim 2, wherein the display controller causes the third image in which the width of the diagonal line is made longer at a position closer to the obstacle to be displayed.

4. The display control device according to claim 1, wherein the display controller causes the third image superimposed on a fourth image indicating a risk area around the mobile object to be displayed.

5. The display control device according to claim 1, wherein the mobile object includes a vehicle, and the display controller causes the third image to be displayed in an area corresponding to a traveling lane of the vehicle.

6. A display control method comprising:

by a computer, acquiring surrounding conditions of a mobile object; and causing a display to display a first image indicating a position of the mobile object, a second image indicating a position of an obstacle present within a predetermined distance from the mobile object, which is acquired, and a third image indicating that the mobile object and the obstacle are approaching each other, wherein the third image includes an image indicating from which of a left side and a right side the obstacle is approaching the mobile object,

wherein the third image is displayed between the first image and the second image, and wherein the third image is drawn as a continuous diagonal line in a traveling direction of the mobile object, and the diagonal line is drawn to extend in a movement direction of the mobile object to avoid the obstacle.

7. A computer-readable non-transitory storage medium that has stored a program causing a computer to execute;

acquiring surrounding conditions of a mobile object; and causing a display to display a first image indicating a position of the mobile object, a second image indicating a position of an obstacle present within a predetermined distance from the mobile object, which is acquired, and a third image indicating that the mobile object and the obstacle are approaching each other, wherein the third image includes an image indicating from which of a left side and a right side the obstacle is approaching the mobile object, wherein the third image is displayed between the first image and the second image, and wherein the third image is drawn as a continuous diagonal line in a traveling direction of the mobile object, and the diagonal line is drawn to extend in a movement direction of the mobile object to avoid the obstacle.

8. A display control device comprising:

an acquirer configured to acquire surrounding conditions of a mobile object; and a display controller configured to cause a display to display a first image indicating a position of the mobile object, a second image indicating a position of an obstacle present within a predetermined distance from the mobile object, which is acquired by the acquirer, a third image indicating that the mobile object and the obstacle are approaching each other, and a fourth image indicating a risk area around the mobile object, wherein the third image includes an image indicating from which of a left side and a right side the obstacle is approaching the mobile object, wherein the third image is displayed between the first image and the second image, and wherein the third image is drawn as a continuous diagonal line in a traveling direction of the mobile object, and the diagonal line is drawn to extend in a movement direction of the mobile object to avoid the obstacle.

* * * * *